United States Patent [19]

Clement et al.

[11] 4,205,892
[45] Jun. 3, 1980

[54] PANELBOARD HAVING CONNECTOR MEANS FOR MAKING PLUG-IN AND BOLTED CONNECTIONS WITH CIRCUIT BREAKER LINE TERMINALS

[75] Inventors: Ralph C. Clement; Charles W. Parmenter, both of Bellefontaine, Ohio

[73] Assignee: Gould Inc., Rolling Meadows, Ill.

[21] Appl. No.: 921,590

[22] Filed: Jul. 3, 1978

[51] Int. Cl.² .............................................. H01R 9/00
[52] U.S. Cl. ................................ 339/198 N; 361/363
[58] Field of Search ....... 339/198 R, 198 G, 198 GA, 339/198 N, 198 H, 119 R, 22 B, 205, 262, 242, 75 R, 75 M, 75 MP, 75 P, 75 T; 361/346, 353, 355, 358, 361, 363, 362, 359, 360

[56] References Cited

U.S. PATENT DOCUMENTS

| | | | |
|---|---|---|---|
| 2,719,251 | 9/1955 | Stewart | 339/198 N |
| 2,738,446 | 3/1956 | Fleming | 361/361 |
| 2,766,405 | 10/1956 | Edmunds | 339/198 N X |
| 2,837,699 | 6/1958 | Fore | 361/363 |
| 2,897,410 | 7/1959 | Hammerly | 339/198 NX |
| 3,054,025 | 9/1962 | Edmunds | 339/262.R X |
| 3,541,397 | 11/1970 | Kobryner | 361/363 |

*Primary Examiner*—Joseph H. McGlynn
*Assistant Examiner*—John S. Brown
*Attorney, Agent, or Firm*—Ostrolenk, Faber, Gerb & Soffen

[57] ABSTRACT

A panelboard interior is provided with a row of connector assemblies. Each assembly includes a relatively rigidly conducting strap mounted directly to a main bus bar, and a formed spring member mounted on the strap and cooperating therewith to form back-to-back pockets constituting female plug-in connectors. Portions of the strap and spring defining each pocket are provided with apertures which are aligned with an aperture through a circuit breaker line terminal disposed within the pocket in question. The strap aperture is threaded to receive a clamping bolt which extends through the aligned apertures in the spring member and circuit breaker line terminal to firmly clamp the latter between the spring member and the strap.

8 Claims, 6 Drawing Figures

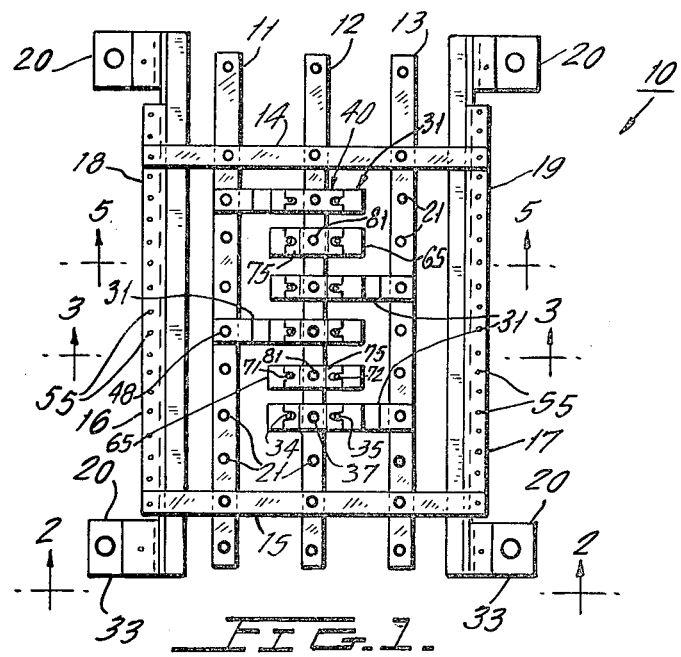
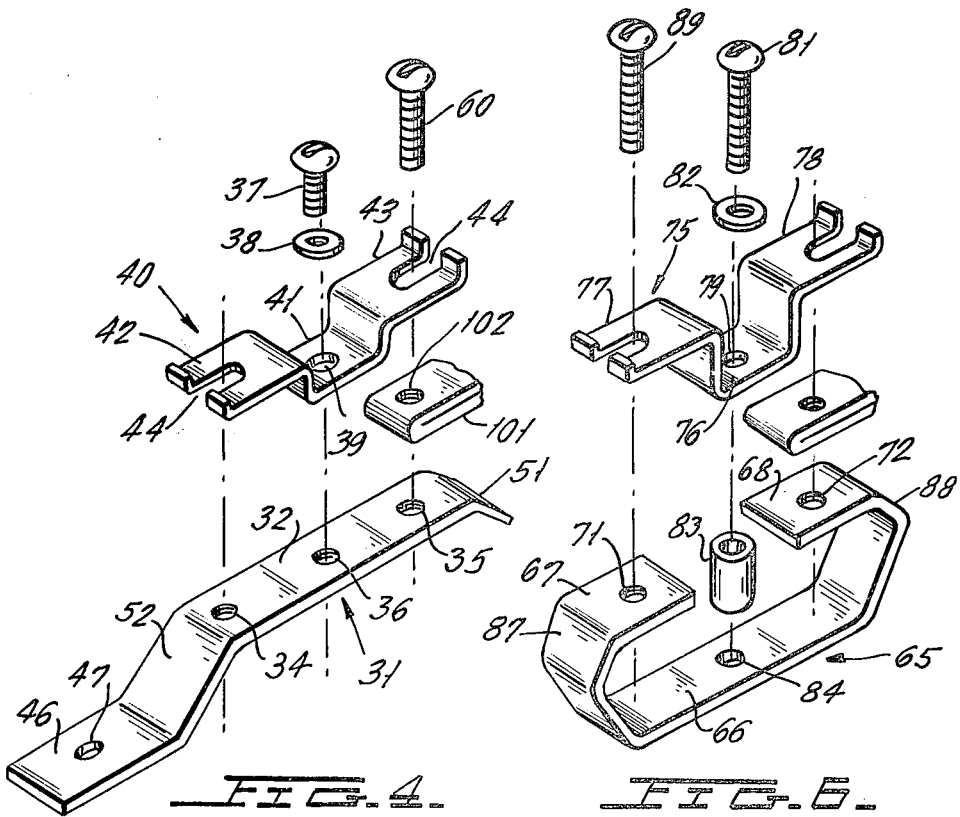

PANELBOARD HAVING CONNECTOR MEANS FOR MAKING PLUG-IN AND BOLTED CONNECTIONS WITH CIRCUIT BREAKER LINE TERMINALS

This invention relates to panelboards in general and more particularly relates to panelboards for the mounting of both plug-in and bolted type circuit breakers.

Typically, circuit breakers for home and industrial applications, and adapted to be mounted in a panelboard, are provided with either plug-in or bolted type line terminals for engaging connectors extending from the main bus bars of a panelboard. Some panelboard connectors are constructed to be connected with both bolted and plug-in type circuit breakers. Such a connector construction is illustrated in U.S. Pat. No. 3,356,906 issued Dec. 5, 1967 to R. Lamb et al for Connection For Bus Bar Panel Board. In the device of the Lamb et al patent, at each circuit breaker location there is provided a plug-in type connector and a separate bolt-on type connector.

In accordance with the instant invention each circuit breaker location of a panelboard is provided with a female type plug-in connector to receive a circuit breaker line terminal. If, for some reason, the user desires a bolted connection, a screw is utilized to clamp the circuit breaker line terminal between the sections of the plug-in connector. This screw extends through aligned apertures in the line terminal and both sections of the plug-in connector with the aperture of one of the plug-in sections threadably receiving the screw.

Accordingly, a primary object of the instant invention is to provide a panelboard interior having novel means for the making of both plug-in and bolted connections to the line terminal of a circuit breaker.

Another object is to provide a panelboard interior of this type in which bolted and plug-in type connections may be made to the same circuit breaker line terminal.

Still another object is to provide a panelboard interior of this type in which there are line connector assemblies each of which includes a rigid conducting strap cooperating with a spring member to form a pocket which receives the line terminal of a circuit breaker.

A still further object is to provide a panel interior of this type in which the mere insertion of a circuit breaker results in a secure plug-in line connection even if the clamping bolt is not used.

These objects as well as other objects of this invention shall become readily apparent after reading the following description of the accompanying drawings in which:

FIG. 1 is a plan view of a panel interior constructed in accordance with teachings of the instant invention.

FIG. 4 is an enlarged exploded perspective of the connector assembly shown in FIG. 3.

FIG. 6 is an enlarged exploded perspective of the connector assembly seen in FIG. 5.

Figure 2:
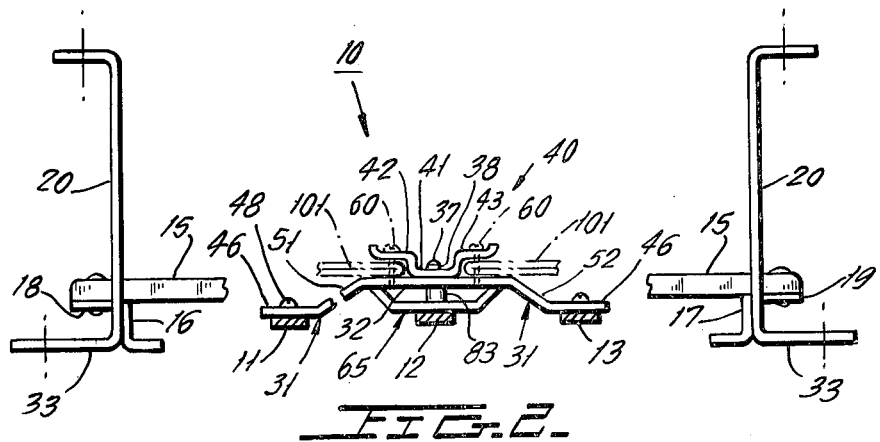
FIG. 2 is an end view of the panel interior partly broken away, looking in the direction of arrows 2—2 of FIG. 1.

Now referring to the Figures. Panelboard interior 10 of FIGS. 1 and 2 is intended to mount a plurality of circuit breakers 100 generally having a construction of the type described in detail in U.S. Pat. No. 4,079,346 issued Mar. 14, 1978 to T. J. Rys for a Mounting Plate For Molded Case Circuit Breaker.

Panelboard interior 10 includes three elongated main bus bars 11, 12, 13 secured to the underside of transverse insulators 14, 15 so as to be in equally spaced parallel relationship. Disposed outboard of bus bars 11-13 and extending parallel thereto are mounting rails 16, 17 of Z-shaped cross-section. As will hereinafter be seen, forward legs 18, 19 of the respective rails 16, 17 constitute ledges for supporting the load ends of circuit breakers 100. Each end of ledges 18, 19 are cut away to provide clearances for positioning of combination mounting and trim brackets 20 at the four corners of panelboard interior 10. Brackets 20 are welded to rails 16, 17.

Each of the main bus bars 11-13 is provided with a plurality of equally spaced apertures 21 which define locations at which the connector assemblies of FIG. 4 are secured to outer bus bars 11 and 13, and the connector assembly of FIG. 6 is secured to center bus bar 12.

Figure 3:
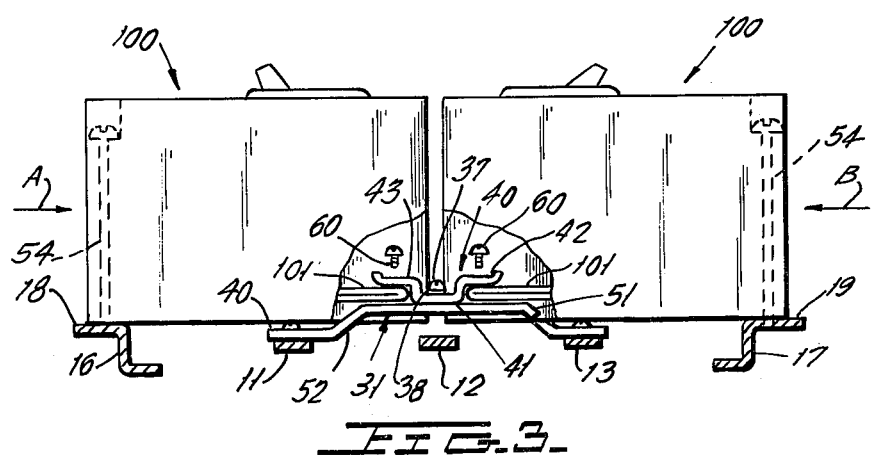
FIG. 3 is an elevation, partially sectioned, of circuit breakers mounted end-to-end to the panelboard interior of FIG. 1 at the location indicated by line 3-3.

Referring more particularly to FIGS. 3 and 4, it is seen that each of the two connector assemblies mounted to bus bar 11 includes relatively rigid conducting strap 31 having main portion 32 which lies in a plane parallel to and forward of the plane containing bus bars 11-13. This plane is parallel to the mounting surface (not shown) which will be engaged by feet 33 of brackets 20 for mounting of panelboard interior 10. Main section 32 is provided with tapped holes 34, 35 for reason to be hereinafter explained, and is also provided with tapped hole 36 disposed between holes 34, 35 to receive screw 37. The latter extends through lock washer 38 and clearance aperture 39 in formed spring member 40 which is secured at the front of strap 31 by screw 37.

Spring member 40 is elongated and includes a generally U-shaped central portion whose base 41 abuts the upper or front surface of main section 32 over hole 36. The end portion 42, 43 of spring member 40 are identical, with each including an aperture in the form of an elongated slot open at the free end of the respective sections 42, 43. For a reason to be hereinafter seen, apertures 44 are in alignment with holes 34, 35.

End 46 of strap 31 is parallel to and offset rearwardly from main section 32, and is provided with aperture 47 through which fastener 48 (FIG. 1) extends to secure strap 31 to bus bar 11 with section 46 adjacent the forward surface of bus bar 11. For a reason to be hereinafter seen, strap 31 also includes rearwardly extending ramps 51, 52 at opposite ends of main section 32 with ramp 52 extending between sections 32 and 46. Similarly, the ends of spring member 40 are bent forward.

As seen best in FIG. 3, spring sections 42 and 43 are generally parallel to and forwardly offset from main section 32 to form recesses or plug-in pockets which receive line terminals 101 of circuit breakers 100. In particular, the left circuit breaker 100 of FIG. 3 is mounted in the position shown by movement in the direction indicated by arrow A and during this movement the free end of contact 101 enters the recess between sections 42, 32 through the entrance at the left thereof with respect to FIG. 3. As line terminal 101 enters this recess section 42 is deflected forward to create a spring force which biases section 42 rearward to firmly clamp terminal 101 against the forward surface of strap 31. The load end of circuit breaker 100 is mechanically secured to rail 16 by elongated stud 54 which is received by the appropriate threaded aperture 55 extending through ledge 18. Ramp 52 and the forwardly turned edge of section 42 at the entrance to the recess between sections 32, 42 directs terminal 101 into this recess.

The recess formed between sections 32, 43 is entered by line terminal 101 of the right circuit breaker 100 shown in FIG. 3 by moving the latter in the direction indicated by arrow B. With circuit breakers 100 operatively mounted as seen in FIG. 3, the clearance apertures 102 through line terminals 101 are aligned with tapped holes 34, 35. If a bolted connection is desired screws 60 may be threadably inserted into holes 34, 35 from the front end thereof. The left screw 60 passes through aperture 44 of spring member section 42, terminal aperture 102 and into tapped hole 34 so that when screw 60 is tightened the head thereof will bear against the front of spring member portion 42 to clamp line contact 101 between sections 32, 42. Similarly, the right screw 60 will extend through the other clearance apertures 44, 102 and will be threadably received by holes 35 for clamping of the right line contact 101 between sections 32, 43.

Figure 5:
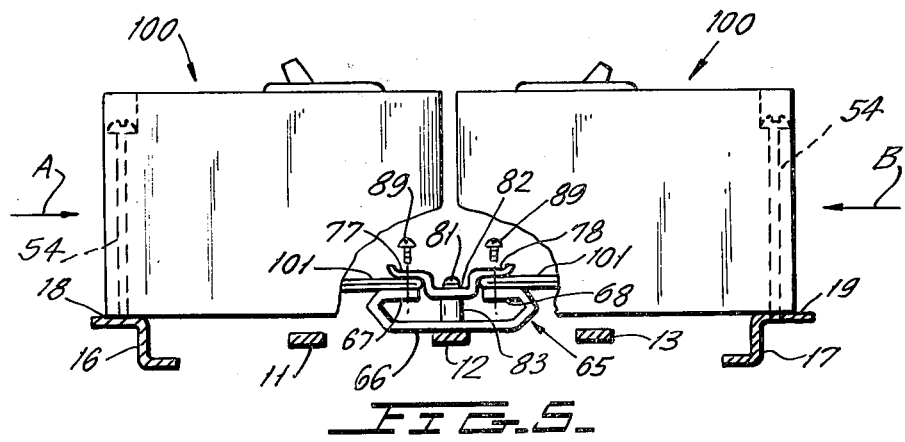
FIG. 5 is a view similar to FIG. 3 taken at the location indicated by line 5-5 of FIG. 1.

The connector assemblies 31, 40 connected to the outer bus bars 11, 13 are each of identical construction. However, the connector assembly 65, 75 of FIGS. 5 and 6 mounted to center bus bar 12 is of a different construction. More particularly, relatively stiff conducting strap 65 is a generally U-shaped member having base 66 and inwardly turned ends 67, 68 both lying in a common plane with main section 32 of strap 31. Sections 67, 68 are provided with tapped holes 71, 72 spaced apart by the same distance as holes 34, 35. Formed spring member 75 is of the same general shape as spring member 40, the basic difference being that the U base 76 at the center of member 75 is more rearwardly offset from end portions 77, 78 than portions 42, 43 are forwardly offset from base 41. Screw 81 for mounting assemblies 65, 75 to center bus bar 12 passes rearwardly through lock washer 82, clearance aperture 79 in base 76, spacer sleeve 83, and clearance aperture 84 in base 66 and is received by one of the threaded apertures 21 in bus bar 12 to firmly secure assembly 65, 75 with base 66 of strap 65 abutting the front surface of center bus bar 12. The upturned free ends of spring member 75 and ramps 87, 88 of strap 65 are adjacent the entrance to the recesses of assembly 65, 75 to direct terminals 101 into these recesses. Optionally, clamping screws 89 may be utilized to form bolted connections which clamp line terminals 101 firmly against the forward surfaces of strap sections 67, 68.

Although a preferred embodiment of this invention has been described, many variations and modifications will now be apparent to those skilled in the art, and it is therefore preferred that the instant invention be limited not by the specific disclosure herein, but only by the appending claims.

What is claimed is:

1. A panelboard interior constructed for mounting on a support surface at the front thereof, said interior including an elongated bus bar having its longitudinal axis extending generally parallel to a support surface to which the interior is mounted, a plurality of plug-in connector assemblies connected to said bus bar and spaced lengthwise thereof, each of said assemblies including first and second portions cooperating to form a recess therebetween having an entrance through which a circuit breaker terminal is insertable into said recess to be engaged by said first and second portions, said entrance being positioned to admit a circuit breaker terminal moving generally at right angles to said longitudinal axis and in a plane generally parallel to a support surface on which the interior is mounted wherein said second portion is resiliently deflectable and is deflected by a circuit breaker terminal when the latter is disposed within said recess and wherein said assemblies are disposed in front of the bus bar with said second portion disposed in front of said first portion.

2. a panelboard interior as set forth in claim 1 in which the first portion is relatively rigid and is constructed of relatively good electrically conductive material.

3. A panelboard interior as set forth in claim 2 in which the first portion is provided with a tapped hole to threadably receive a clamping screw extending through aperture means of said second portion and an aperture through a circuit breaker terminal when the latter is disposed within said recess.

4. A panelboard interior as set forth in claim 3 in which the aperture means is elongated in a direction generally at right angles to the longitudinal axis of the bus bar.

5. a panelboard interior as set forth in claim 3 in which the first portion is part of a relatively rigid strap connected directly to said bus bar and said second portion is part of a formed spring member mounted to said strap.

6. A panelboard interior as set forth in claim 5 in which the strap includes a ramp formation adjacent said entrance for directing a circuit breaker terminal toward said recess.

7. A panelboard interior as set forth in claim 5 in which the rigid strap also includes a mirror image of said first portion and the spring member includes a mirror image of the second portion, said mirror images cooperating to form another recess therebetween having another entrance through which a circuit breaker terminal is insertable into said another recess to be engaged by said mirror images, said entrance and said another entrance being positioned to admit circuit breaker terminals moving in respective opposite directions.

8. A panelboard interior as set forth in claim 7 in which there is another elongated bus bar parallel to said bus bar and spaced therefrom in a plane generally parallel to a support surface on which the interior is mounted, additional straps identical to said straps connected to said another bus bar at locations spaced lengthwise thereof, an individual additional spring member mounted on each of said additional straps, said spring members and said additional spring members being disposed in a single row extending generally parallel to the longitudinal axes of said bus bars with one of said spring members being interposed between adjacent ones of said additional spring members.

* * * * *